United States Patent
Bang et al.

(10) Patent No.: US 8,160,174 B2
(45) Date of Patent: Apr. 17, 2012

(54) SIGNAL DETECTION METHOD AND RECEIVER

(75) Inventors: Young Jo Bang, Daejeon (KR); Hyeong Sook Park, Daejeon (KR); Jun-Woo Kim, Daejeon (KR); Kyung Yeol Sohn, Daejeon (KR); Chang Wahn Yu, Daejeon (KR); Youn Ok Park, Daejeon (KR); Jee Hwan Ahn, Daejeon (KR); Il Min Kim, Suwon-si (KR)

(73) Assignees: Samsung Electronic Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 254 days.

(21) Appl. No.: 12/627,506

(22) Filed: Nov. 30, 2009

(65) Prior Publication Data

US 2010/0135438 A1    Jun. 3, 2010

(30) Foreign Application Priority Data

Dec. 1, 2008    (KR) .................. 10-2008-0120726
Sep. 28, 2009    (KR) .................. 10-2009-0091963

(51) Int. Cl.
*H04B 7/02*    (2006.01)
*H04L 5/12*    (2006.01)
*H04L 27/06*    (2006.01)

(52) U.S. Cl. ............... 375/276; 375/265; 375/340

(58) Field of Classification Search ........ 375/262, 375/265, 267, 340, 341; 370/208, 334; 714/794, 714/795

See application file for complete search history.

(56) References Cited

U.S. PATENT DOCUMENTS

| 2007/0230609 A1 | 10/2007 | Hwang et al. | |
|---|---|---|---|
| 2008/0152032 A1* | 6/2008 | Lee et al. | 375/260 |
| 2008/0310556 A1* | 12/2008 | Lee et al. | 375/340 |
| 2009/0074114 A1* | 3/2009 | Ojard et al. | 375/341 |
| 2009/0116590 A1* | 5/2009 | Lee et al. | 375/340 |

FOREIGN PATENT DOCUMENTS

KR    10-2007-0118835 A    12/2007

OTHER PUBLICATIONS

Ezio Biglieri et al., Doubly Iterative Decoding of Space-Time Turbo Codes With a Large Number of Antennas, IEEE Transactions on Communications, May 2005, pp. 773-779, vol. 53, No. 5.

Il-Min Kim et al., Very Fast Detection for Rate-2 Quasi-Orthogonal STBCs, IEEE Transactions on Wireless Communications, Jan. 2009, vol. 8, No. 1.

* cited by examiner

*Primary Examiner* — Young T. Tse

(74) *Attorney, Agent, or Firm* — Jefferson IP Law, LLP

(57) ABSTRACT

Disclosed is a method of detecting signals at a receiver of a communication system with a multiple input multiple output antenna. With the signal detection method, a square of the distance between a received signal vector and a channel status-considered transmission symbol vector is calculated first, and the square of the distance is then classified into first and second components. The first component is minimized to calculate a plurality of first soft symbol estimates. A solution set of the first component is calculated on the basis of the plurality of first soft symbol estimates. The second component is minimized to calculate a plurality of second soft symbol estimates. A solution set of the second component is calculated on the basis of the plurality of second soft symbol estimates. A final solution set is calculated by doing the sum of the first component solution set and the second component solution.

20 Claims, 5 Drawing Sheets

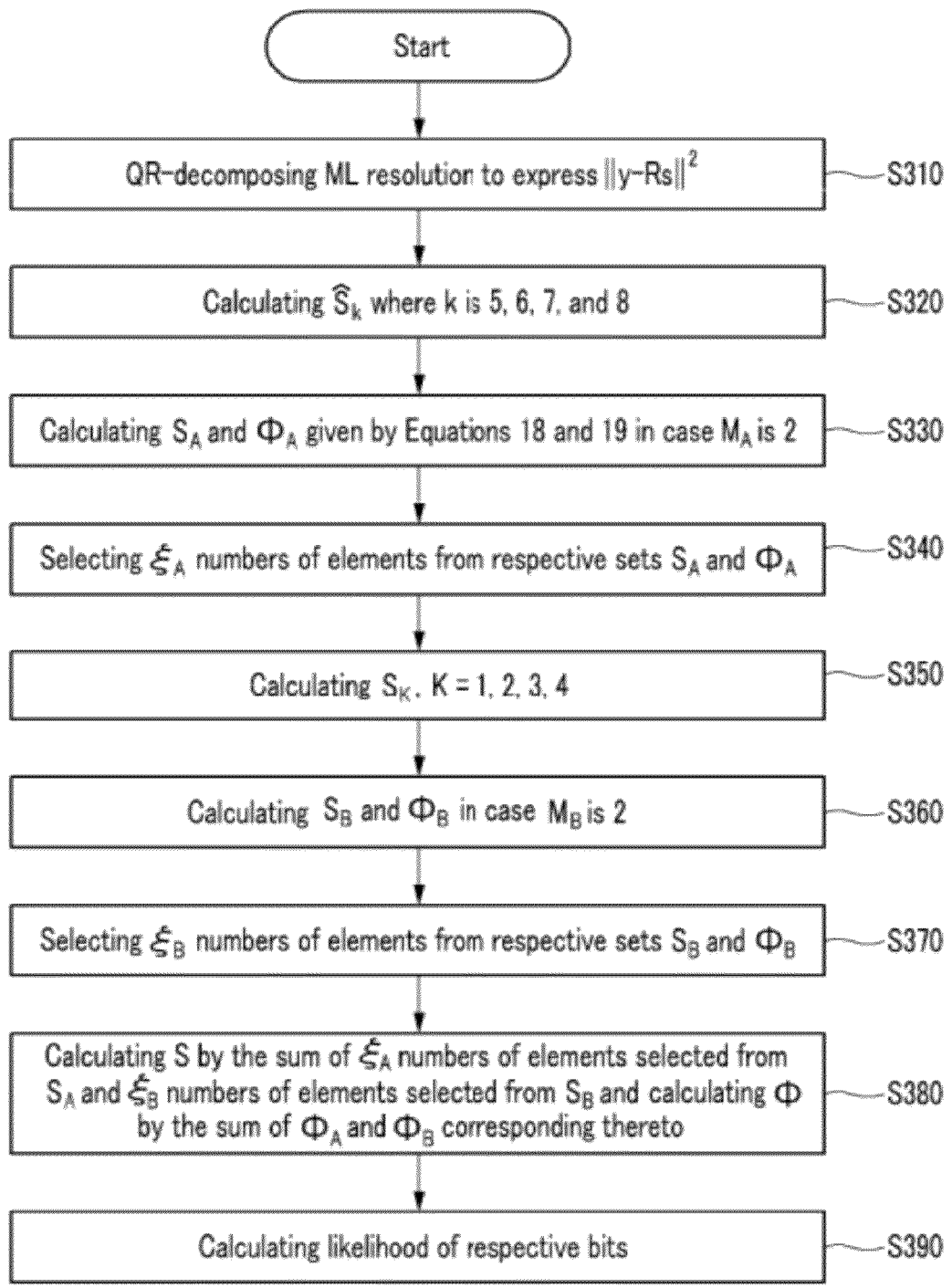

FIG.4

```
IF A[d₂, d₃] < A[d₁, d₄]
    IF A[d₁, d₂] < A[d₃]
        IF A[d₁, d₃] < A[d₄]
            IF A[d₂, d₃] < A[d₄]
                IF A[d₁, d₂, d₃] < A[d₄] → Case 1
                ELSE → Case 2
                END
            ELSE → Case 3
            END
        ELSE → Case 4
        END
    ELSEIF A[d₁, d₂] < A[d₄]
        IF A[d₁, d₃] < A[d₄]
            IF A[d₂, d₃] < A[d₄]
                IF A[d₁, d₂, d₃] < A[d₄] → Case 5
                ELSE → Case 6
                END
            ELSE → Case 7
            END
        ELSE → Case 8
        END
    ELSE → Case 9
    END
ELSE
    IF A[d₁, d₂] < A[d₃]
        IF A[d₁, d₃] < A[d₄] → Case 10
        ELSE → Case 11
        END
    ELSEIF A[d₁, d₂] < A[d₄]
        IF A[d₁, d₃] < A[d₄] → Case 12
        ELSE → Case 13
        END
    ELSE → Case 14
    END
END
```

FIG.5

| | Case 1 | Case 2 | Case 3 | Case 4 | Case 5 | Case 6 | Case 7 |
|---|---|---|---|---|---|---|---|
| 1st | $A_{1,1,1,1}$ | | | | | | |
| 2nd | $A[d_1]$ | | | | | | |
| 3th | $A[d_2]$ | | | | | | |
| 4th | $A[d_1, d_2]$ | $A[d_1, d_2]$ | $A[d_1, d_2]$ | $A[d_1, d_2]$ | $A[d_3]$ | $A[d_3]$ | $A[d_3]$ |
| 5th | $A[d_3]$ | $A[d_3]$ | $A[d_3]$ | $A[d_3]$ | $A[d_1, d_2]$ | $A[d_1, d_2]$ | $A[d_1, d_2]$ |
| 6th | $A[d_1, d_3]$ | $A[d_1, d_3]$ | $A[d_1, d_3]$ | $A[d_4]$ | $A[d_1, d_3]$ | $A[d_1, d_3]$ | $A[d_1, d_3]$ |
| 7th | $A[d_2, d_3]$ | $A[d_2, d_3]$ | $A[d_4]$ | $A[d_1, d_3]$ | $A[d_2, d_3]$ | $A[d_2, d_3]$ | $A[d_4]$ |
| 8th | $A[d_1, d_2, d_3]$ | $A[d_4]$ | $A[d_2, d_3]$ | $A[d_2, d_3]$ | $A[d_1, d_2, d_3]$ | $A[d_4]$ | $A[d_2, d_3]$ |
| 9th | $A[d_4]$ | $A[d_1, d_2, d_3]$ | $A[d_1, d_4]$ | $A[d_1, d_4]$ | $A[d_4]$ | $A[d_1, d_2, d_3]$ | $A[d_1, d_4]$ |
| 10th | $A[d_1, d_4]$ | $A[d_1, d_4]$ | $A[d_1, d_2, d_3]$ | $A[d_2, d_4]$ | $A[d_1, d_4]$ | $A[d_1, d_4]$ | $A[d_1, d_2, d_3]$ |
| 11th | $A[d_2, d_4]$ | $A[d_2, d_4]$ | $A[d_2, d_4]$ | $A[d_1, d_2, d_3]$ | $A[d_2, d_4]$ | $A[d_2, d_4]$ | $A[d_2, d_4]$ |
| 12th | $A[d_1, d_2, d_4]$ | $A[d_1, d_2, d_4]$ | $A[d_1, d_2, d_4]$ | $A[d_1, d_2, d_4]$ | $A[d_3, d_4]$ | $A[d_3, d_4]$ | $A[d_3, d_4]$ |
| 13th | $A[d_3, d_4]$ | $A[d_3, d_4]$ | $A[d_3, d_4]$ | $A[d_3, d_4]$ | $A[d_1, d_2, d_4]$ | $A[d_1, d_2, d_4]$ | $A[d_1, d_2, d_4]$ |
| 14th | $A[d_1, d_3, d_4]$ | | | | | | |
| 15th | $A[d_2, d_3, d_4]$ | | | | | | |
| 16th | $A[d_1, d_2, d_3, d_4]$ | | | | | | |

| | Case 8 | Case 9 | Case 10 | Case 11 | Case 12 | Case 13 | Case 14 |
|---|---|---|---|---|---|---|---|
| 1st | $A_{1,1,1,1}$ | | | | | | |
| 2nd | $A[d_1]$ | | | | | | |
| 3th | $A[d_2]$ | | | | | | |
| 4th | $A[d_3]$ | $A[d_3]$ | $A[d_1, d_2]$ | $A[d_1, d_2]$ | $A[d_3]$ | $A[d_3]$ | $A[d_3]$ |
| 5th | $A[d_1, d_2]$ | $A[d_4]$ | $A[d_3]$ | $A[d_3]$ | $A[d_1, d_2]$ | $A[d_1, d_2]$ | $A[d_4]$ |
| 6th | $A[d_4]$ | $A[d_1, d_2]$ | $A[d_1, d_3]$ | $A[d_4]$ | $A[d_1, d_3]$ | $A[d_4]$ | $A[d_1, d_2]$ |
| 7th | $A[d_1, d_3]$ | $A[d_1, d_3]$ | $A[d_4]$ | $A[d_1, d_3]$ | $A[d_4]$ | $A[d_1, d_3]$ | $A[d_1, d_3]$ |
| 8th | $A[d_2, d_3]$ | $A[d_2, d_3]$ | $A[d_1, d_4]$ | $A[d_1, d_4]$ | $A[d_1, d_4]$ | $A[d_1, d_4]$ | $A[d_1, d_4]$ |
| 9th | $A[d_1, d_4]$ | $A[d_1, d_4]$ | $A[d_2, d_3]$ | $A[d_2, d_3]$ | $A[d_2, d_3]$ | $A[d_2, d_3]$ | $A[d_2, d_3]$ |
| 10th | $A[d_2, d_4]$ | $A[d_2, d_4]$ | $A[d_1, d_2, d_3]$ | $A[d_2, d_4]$ | $A[d_1, d_2, d_3]$ | $A[d_2, d_4]$ | $A[d_2, d_4]$ |
| 11th | $A[d_1, d_2, d_3]$ | $A[d_3, d_4]$ | $A[d_2, d_4]$ | $A[d_1, d_2, d_3]$ | $A[d_2, d_4]$ | $A[d_1, d_2, d_3]$ | $A[d_3, d_4]$ |
| 12th | $A[d_3, d_4]$ | $A[d_1, d_2, d_3]$ | $A[d_1, d_2, d_4]$ | $A[d_1, d_2, d_4]$ | $A[d_3, d_4]$ | $A[d_3, d_4]$ | $A[d_1, d_2, d_3]$ |
| 13th | $A[d_1, d_2, d_4]$ | $A[d_1, d_2, d_4]$ | $A[d_3, d_4]$ | $A[d_3, d_4]$ | $A[d_1, d_2, d_4]$ | $A[d_1, d_2, d_4]$ | $A[d_1, d_2, d_4]$ |
| 14th | $A[d_1, d_3, d_4]$ | | | | | | |
| 15th | $A[d_2, d_3, d_4]$ | | | | | | |
| 16th | $A[d_1, d_2, d_3, d_4]$ | | | | | | |

SIGNAL DETECTION METHOD AND RECEIVER

CROSS-REFERENCE TO RELATED APPLICATION

This application claims priority to and the benefit of Korean Patent Application Nos. 10-2008-0120726 and 10-2009-0091963 filed in the Korean Intellectual Property Office on Dec. 1, 2008 and Sep. 28, 2009, the entire contents of which are incorporated herein by reference.

BACKGROUND OF THE INVENTION (a) Field of the Invention

The present invention relates to a signal detection method, and a receiver.

(b) Description of the Related Art

As wireless communication systems are being developed, speed-related requirements are becoming more and more important. In order to satisfy such requirements, it is needed to use a wide frequency bandwidth, but frequency resources are limited. Accordingly, a multiple input, multiple output (MIMO) antenna technology is used in order to transmit larger amounts of data while using the limited frequency bandwidths.

Among the multiple input multiple output antenna techniques, there are basically a spatial diversity technique where the transmission reliability is enhanced by obtaining diversity profits corresponding to the square of the number of transceiver antennas, and a spatial multiplexing (SM) technique where different data streams are made through different transmission routes.

With the double spatial multiplexing technique, mutual interference is liable to occur between different data streams, and hence the receiver detects and decodes signals considering the interference. The optimal way is to calculate the likelihood of the respective data bits considering the detection and the decoding simultaneously, but it is difficult to operate in such a way because it involves excessive complexity regarding the dimension of constellations and the number of antennas.

Accordingly, an iterative detection decoding (IDD) technique where the likelihood of respective bits is calculated in respective cases of detection and decoding, and the calculated results are repeatedly exchanged so as to calculate the final likelihood of the respective bits, has been introduced. However, such a technique also still involves high complexity so that it is difficult to practically realize the desired system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a communication system with a multiple input multiple output antenna having advantages of performing signal detection with low complexity.

An exemplary embodiment of the present invention provides a method of detecting signals at a receiver of a communication system with a multiple input multiple output antenna. With the signal detection method, a square of the distance between a received signal vector and a channel status-considered transmission symbol vector is calculated, and the square of the distance is classified into first and second components. The first component is minimized to calculate a plurality of first soft symbol estimates. A solution set of the first component is calculated on the basis of the plurality of first soft symbol estimates. The second component is minimized to calculate a plurality of second soft symbol estimates. A solution set of the second component is calculated on the basis of the plurality of second soft symbol estimates. A final solution set is calculated by doing the sum of the first component solution set and the second component solution set.

The step of calculating the first component solution set may include finding a plurality of first points around the plurality of first soft symbol estimates on a constellation, and calculating the first component solution set by using the plurality of first points.

The step of finding the plurality of first points may include finding a first closest point by rounding with respect to the plurality of first soft symbol estimates, respectively.

The step of finding the plurality of first points may further include finding a second closest point by adding 2 to the first closest point or subtracting 2 therefrom.

The step of calculating the second component solution set may include finding a plurality of second points around the plurality of second soft symbol estimates on the constellation, and calculating the second component solution set by using the plurality of second points.

The step of finding the plurality of second points may include finding a first closest point by rounding with respect to the plurality of second soft symbol estimates, respectively.

The step of finding the plurality of second points may further include finding a second closest point by adding 2 to the first closest point or subtracting 2 therefrom.

The signal detection method may further include calculating a point set on the constellation by doing the sum of the plurality of first points and the plurality of second points, and calculating the likelihood of the respective bits of the signals by using the point set and the final solution set.

The step of calculating the square of the distance may include QR-decomposing the maximum likelihood resolution.

The step of calculating the square of the distance may include QR-decomposing the augmented channel matrix.

Another exemplary embodiment of the present invention provides a method of detecting signals at a receiver of a communication system with a multiple input multiple output antenna. With the signal detection method, a square of the distance between a received signal vector and a channel status-considered transmission symbol vector is first calculated, and the square of the distance is classified into first and second components. The first component is minimized to calculate a plurality of first soft symbol estimates. A solution set of the first component is calculated on the basis of the plurality of first soft symbol estimates. A part of the first component solution set is selected, and a plurality of second soft symbol estimates are calculated by using the selected first component solution set. A solution set of the second component is calculated on the basis of the plurality of second soft symbol estimates. A part of the second component solution set is selected, and a final solution set is calculated by doing the sum of the selected first component solution set and the selected second component solution set.

The step of calculating the first component solution set may include finding a plurality of first points around the plurality of first soft symbol estimates on a constellation, and calculating the first component solution set by using the plurality of first points, while the step of calculating the second component solution set includes finding a plurality of second points around the plurality of second soft symbol estimates on the constellation, and calculating the second component solution set by using the plurality of second points.

The signal detection method may further include selecting the first point corresponding to the selected first component solution set, selecting the second point corresponding to the selected second component solution set, calculating a point set on the constellation by doing the sum of the selected first point and the selected second point, and calculating the likelihood of the respective bits of the signals by using the point set and the final solution set.

The step of selecting a part of the first component solution set may include listing elements of the first component solution set in a sequence of from the smallest to the largest and selecting the listed elements sequentially from the smallest, and the step of selecting a part of the second component solution set may include listing elements of the second component solution set in a sequence of from the smallest to the largest and selecting the listed elements sequentially from the smallest.

The number of the first points and the number of the second points may be 2 or less, respectively.

The step of finding the plurality of first points may include finding a first closest point by rounding with respect to the plurality of first soft symbol estimates, and finding a second closest point by adding 2 to the first closest point or subtracting 2 therefrom.

The step of finding the plurality of second points may include finding a first closest point by rounding with respect to the plurality of second soft symbol estimates, respectively, and finding a second closest point by adding 2 to the first closest point or subtracting 2 therefrom.

Another exemplary embodiment of the present invention provides a receiver for a communication system with a multiple input multiple output antenna. The receiver includes a plurality of receiver antennas for receiving signals, a detector for producing the likelihood of the respective bits of the signals from the receiver antenna and detecting signals, and a decoder for decoding the signals detected from the detector. The likelihood is produced by classifying a square of the distance between a received signal vector and a channel status-considered transmission symbol vector into first and second components, and using a plurality of first soft symbol estimates obtained through minimizing the first component, a plurality of second soft symbol estimates obtained through minimizing the second component, first points around the plurality of first soft symbol estimates on a constellation, and second points around the plurality of second soft symbol estimates on the constellation.

The plurality of first points may include a first closest point calculated by rounding with respect to the plurality of first soft symbol estimates, respectively.

The plurality of first points may include a second closest point found by adding 2 to the first closest point or subtracting 2 therefrom.

With the present invention, a receiver for a communication system with a multiple input multiple output antenna can detect signals, and decode the detected signals at a low complexity.

BRIEF DESCRIPTION OF THE DRAWINGS

FIG. 3 is a flowchart of a signal detection method according to another exemplary embodiment of the present invention.

FIG. 4 illustrates a way of listing a solution set with a signal detection method according to another exemplary embodiment of the present invention.

FIG. 5 illustrates elements of the solution set listed according to the way of FIG. 4 with a signal detection method according to another exemplary embodiment of the present invention.

DETAILED DESCRIPTION OF THE EMBODIMENTS

Figure 1:
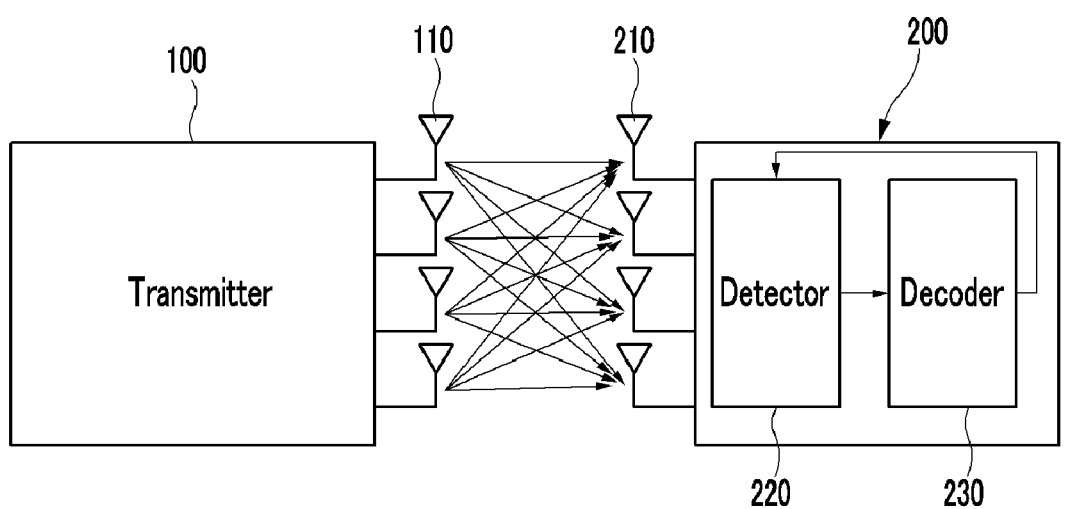
FIG. 1 illustrates a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements throughout the specification. The terms "-er," "-or", and "module" described in the specification mean units for processing at least one function or operation, which can be implemented by hardware components, software components, or combinations thereof.

In this specification, the mobile station (MS) may refer to a terminal, a mobile terminal (MT), a subscriber station (SS), a portable subscriber station (PSS), user equipment (UE), or an access terminal (AT), and may have the functions of some or all of those referred to.

In this specification, the base station (BS) may refer to an access point (AP), a radio access station (RAS), a node B (Node B), an evolved node B (eNodeB), a base transceiver station (BTS), or a mobile multihop relay (MMR)-BS, and have the functions of some or all of those referred to.

A signal detection method and receiver method according to an exemplary embodiment of the present invention will now be described in detail with reference to the accompanying drawings.

FIG. 1 illustrates a wireless communication system according to an exemplary embodiment of the present invention.

As shown in FIG. 1, the wireless communication system includes a transmitter 100 and a receiver 200.

The transmitter 100 includes a plurality of transmitter antennas 110. The transmitter 100 conducts scrambling, encoding, and modulating with respect to the transmission data, and broadcasts them to the air through the transmitter antennas 110.

The receiver 200 includes a plurality of receiver antennas 210, a detector 220, and a decoder 230. The data received through the respective receiver antennas 210 are signal-detected at the detector 220, and the detected signals are decoded at the decoder 230.

The signal detection made at the detector 220 is to produce the likelihood of the bits of the received signals.

The received signal vector y can be expressed by Equation 1.

$$y = Hs + n \qquad \text{(Equation 1)}$$

In Equation 1, H represents a channel matrix, s represents a transmission symbol vector, and n represents an additive white noise vector. The likelihood $L_D(x_k|y)$ produced by the detector 220 is expressed by Equation 2.

$$L_D(x_k \mid y) = \ln\left(\frac{Pr[x_k = +1 \mid y]}{Pr[x_k = -1 \mid y]}\right) \quad \text{(Equation 2)}$$

$$= L_A(x_k) + L_E(x_k \mid y)$$

In Equation 2, the prior information $$L_A(x_k) = \ln\left(\frac{Pr[x_k = +1]}{Pr[x_k = -1]}\right)$$

is calculated by using the likelihood of the respective bits received through feedback from the decoder 230. When no information from the decoder 230 exists, the value of zero which is obtained by substituting 0.5 for the numerator and denominator is used with respect to the respective bits. As very high complexity is required to correctly compute the $L_E(x_k|y)$ part of Equation 2, such a part is approximated and expressed by Equation 3.

$$L_E(x_k \mid y) \approx \frac{1}{2} \max_{x \in X_{k,+1}} \left(-\frac{1}{\sigma^2}\|y - Hs\|^2 + x_{[k]}^T \cdot L_{A,[k]}\right) - \quad \text{(Equation 3)}$$

$$\frac{1}{2} \max_{x \in X_{k,-1}} \left(-\frac{1}{\sigma^2}\|y - Hs\|^2 + x_{[k]}^T \cdot L_{A,[k]}\right)$$

In Equation 3, x is a vector of the +1 or −1 bits obtained from the transmission symbol vector s. Therefore, with the case of the binary phase shift keying (BPSK), x and s are the same vector. However, in case other constellations are used, x and s are not identical. The respective elements of the vector x have the value of +1 or −1, but the elements of the vector s are given by one point on the constellation. Furthermore, the set $X_{k,+1}$ being a vector set where the k-th element of the vector x is +1 and other elements thereof involve all possible cases is defined by Equation 4.

$$X_{k,+1} = \{x|x_k = +1\}, X_{k,-1} = \{x|x_k = -1\} \quad \text{(Equation 4)}$$

Furthermore, the vector $x_{[k]}$ is defined by a vector where the k-th element $x_k$ of the vector x is removed, and similarly, $L_{A,[k]}$ expresses a vector of $L_A$ values concerning all the elements of the vector x except for the element $x_k$. The highest complexity is required in computing the given $L_E(x_k|y)$ to calculate $\|y - Hs\|^2$ with respect to all the vectors x (i.e., s corresponding thereto) belonging to the set $X_{k,+1}$.

A signal detection method, that is, a likelihood calculation method according to an exemplary embodiment of the present invention, will now be described with respect to FIG. 2 and FIG. 3.

Figure 2:
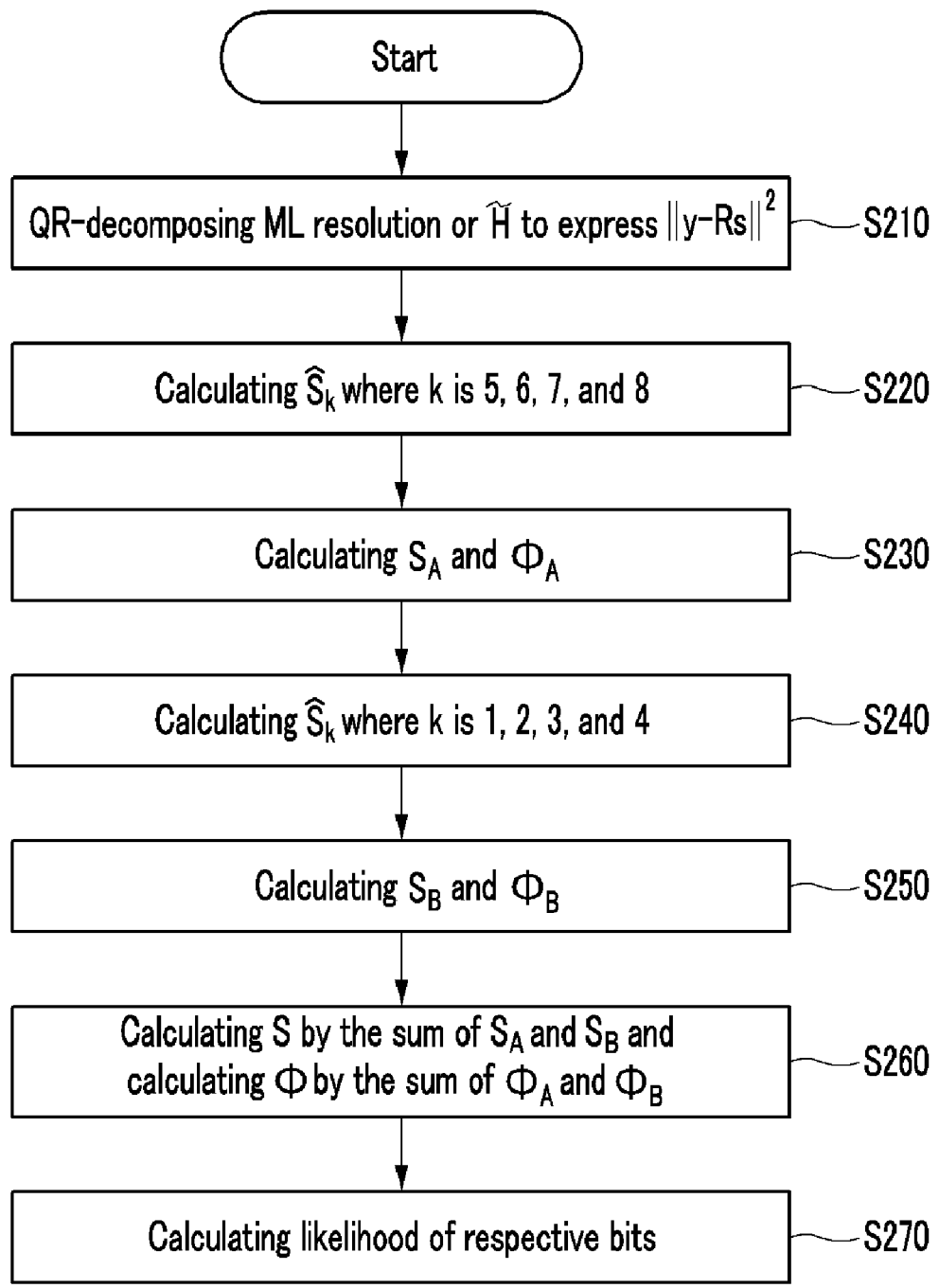
FIG. 2 is a flowchart of a signal detection method according to an exemplary embodiment of the present invention.

FIG. 2 is a flowchart illustrating a signal detection method according to an exemplary embodiment of the present invention.

Referring to FIG. 2, with a signal detection method according to an exemplary embodiment of the present invention, the maximum likelihood (ML) resolution or the augmented channel matrix $\hat{H}$ is QR-decomposed so as to express $\|y-Rs\|^2$ at the step S210.

The ML resolution is obtained in the following way.

Assuming that the number of transmitter antennas 110 is four and the data transmission rate is 2, spatio-temporal codes like Equation 5 are considered.

$$G = \begin{bmatrix} g_1 & -g_2^* \\ g_2 & g_1^* \\ g_3 & -g_4^* \\ g_4 & g_3^* \end{bmatrix} \quad \text{(Equation 5)}$$

In case the number of receiver antennas 210 is assumed to be $n_r$, the received signal r is written by Equation 6.

$$r = \hat{H}s + n \quad \text{(Equation 6)}$$

In Equation 6, $$r := [(r_1^1)', (r_1^1)'', (r_2^1)', (r_2^1)'', \ldots, (r_1^{n_r})', (r_1^{n_r})'', (r_2^{n_r})', (r_2^{n_r})'']^T$$

$$n := [(n_1^1)', (n_1^1)'', (n_2^1)', (n_2^1)'', \ldots, (n_1^{n_r})', (n_1^{n_r})'', (n_2^{n_r})', (n_2^{n_r})'']^T$$

$$s := [g_1', g_1'', g_2', g_2'', g_3', g_3'', g_4', g_4'']^T$$

$$=: [s_1, s_2, s_3, s_4, s_5, s_6, s_7, s_8,]^T$$

$$\hat{H} = \begin{bmatrix} h'_{1,1} & -h''_{1,1} & h'_{1,2} & -h''_{1,2} & h'_{1,3} & -h''_{1,3} & h'_{1,4} & -h''_{1,4} \\ h''_{1,1} & h'_{1,1} & h''_{1,2} & h'_{1,2} & h''_{1,3} & h'_{1,3} & h''_{1,4} & h'_{1,4} \\ h'_{1,2} & h''_{1,2} & -h'_{1,1} & -h''_{1,1} & h'_{1,4} & h''_{1,4} & -h'_{1,3} & -h''_{1,3} \\ h''_{1,2} & -h'_{1,2} & -h''_{1,1} & h'_{1,1} & h''_{1,4} & -h'_{1,4} & -h''_{1,3} & h'_{1,3} \\ \vdots & \vdots & \vdots & \vdots & \vdots & \vdots & \vdots & \vdots \\ h'_{n_r,2} & h''_{n_r,2} & -h'_{n_r,1} & -h''_{n_r,1} & h'_{n_r,2} & h''_{n_r,2} & -h'_{n_r,3} & -h''_{n_r,3} \\ h''_{n_r,2} & -h'_{n_r,2} & -h''_{n_r,1} & h'_{n_r,1} & h''_{n_r,2} & -h'_{n_r,2} & -h''_{n_r,3} & h'_{n_r,3} \end{bmatrix}$$

Furthermore, ( )' and ( )" represent the real number and the imaginary number parts of the complex number values, and $r_t^j$ represents the received signal at the t-th time slot in the j-th receiver antenna 210, while $h_{j,i}$ represents the channel gain ranged from the i-th transmitter antenna to the j-th receiver antenna. And, $n_t^j$ represents the white noise at the t-th slot in the j-th receiver antenna.

Assuming that the respective transmission symbols $g_k$ are generated from the constellation given as the $M^{2-}$ quadrature amplitude modulation (QAM), the symbol $s_k$ is generated from the constellation given as the M-pulse amplitude modulation (referred to hereinafter as the "PAM"), which is indicated by C as with Equation 7.

$$s_k \in C := \{-M+1, -M+3, \ldots, -1, 1, \ldots, M-3, M-1\}$$

In this case, the maximum ML resolution $s^{ML}$ is obtained through Equation 8.

$$s^{ML} = \underset{s \in C^8}{\operatorname{argmin}} \|r - \hat{H}s\|^2. \quad \text{(Equation 8)}$$

When the QR decomposition is made with respect to the channel matrix $\hat{H}$, Equation 8 is re-written as Equation 9.

$$s^{ML} = \underset{s \in C^8}{\arg\min} \left\| \hat{y} - \hat{R}s \right\|^2 \quad \text{(Equation 9)}$$

Meanwhile, the augmented channel matrix like Equation 10 is considered, and QR-decomposed.

$$\tilde{H} := \begin{bmatrix} \hat{H} \\ \frac{1}{\sqrt{\gamma}} I_{8 \times 8} \end{bmatrix} = \tilde{Q}\tilde{R} = \begin{bmatrix} \tilde{Q}_1 \\ \tilde{Q}_2 \end{bmatrix} \tilde{R} \quad \text{(Equation 10)}$$

In Equation 10, $\tilde{Q}$ is a unit matrix having a dimension of $(4n_R+8) \times 8$, and $\tilde{R}$ is an upper-triangle matrix having a dimension of $8 \times 8$. Furthermore, $\tilde{Q}_1$ is a part matrix of $\tilde{Q}$ having a dimension of $4n_R \times 8$, and $\tilde{Q}_2$ is a part matrix of $\tilde{Q}$ having a dimension of $8 \times 8$. In this case, the signal detection is made as with Equation 11.

$$\tilde{s} = \underset{s \in C^8}{\arg\min} \left\| \tilde{y} - \tilde{R}s \right\|^2 \quad \text{(Equation 11)}$$

In Equation 11, $\tilde{y} = \tilde{Q}^T r$.

Meanwhile, it is required in calculating the likelihood ratio $L_E(x_k|y)$ to obtain the results of Equation 9 and Equation 11, and a plurality of points therearound on the constellation. A method of obtaining the plurality of points will now be described.

The matrixes $\hat{R}$ and $\tilde{R}$ are calculated by using the Gram-Schmidt method, and each are indicated in the same form as with Equation 12.

$$R = \begin{bmatrix} \alpha_1 & 0 & 0 & 0 & \beta_1 & \beta_2 & \beta_3 & \beta_4 \\ 0 & \alpha_1 & 0 & 0 & -\beta_2 & \beta_1 & -\beta_4 & \beta_3 \\ 0 & 0 & \alpha_1 & 0 & -\beta_3 & \beta_4 & \beta_1 & -\beta_2 \\ 0 & 0 & 0 & \alpha_1 & -\beta_4 & -\beta_3 & \beta_2 & \beta_1 \\ 0 & 0 & 0 & 0 & \alpha_2 & 0 & 0 & 0 \\ 0 & 0 & 0 & 0 & 0 & \alpha_2 & 0 & 0 \\ 0 & 0 & 0 & 0 & 0 & 0 & \alpha_2 & 0 \\ 0 & 0 & 0 & 0 & 0 & 0 & 0 & \alpha_2 \end{bmatrix} \quad \text{(Equation 12)}$$

In Equation 12, $\alpha_1 = \|h_1\|$, $\beta_1 = \frac{1}{\alpha_1} h_1^T h_5$, $\beta_2 = \frac{1}{\alpha_1} h_1^T h_6$, $\beta_3 = \frac{1}{\alpha_1} h_1^T h_7$, $\beta_4 = \frac{1}{\alpha_1} h_1^T h_8$ $\alpha_2 = \sqrt{\|h_5\|^2 - \beta_1^2 - \beta_2^2 - \beta_3^2 - \beta_4^2}$ In Equation 12, if $h_j$ represents the j-th column of $\hat{H}$, R represents $\hat{R}$, while if $h_j$ represents the j-th column of $\tilde{H}$, R represents $\tilde{R}$.

Furthermore, $\hat{Q}$ and $\tilde{Q}$ may be expressed in the same form as with Equation 13.

$$Q = [q_1, q_2, q_3, q_4, q_5, q_6, q_7, q_8] \quad \text{(Equation 13)}$$

In Equation 13, the respective columns $q_j$ are given in the following way.

$q_j = \frac{1}{\alpha_1} h_j, \, j = 1, 2, 3, 4$ $q_j = \frac{1}{\alpha_2} \left( h_j - \sum_{k=1}^{4} R_{k,j} q_k \right)$ In Equation 13, $R_{k,j}$ represent the (k, j)th elements of the matrix R.

Equation 9 and Equation 11 can be expressed by Equation 14, Equation 15, and Equation 16 while using Equation 12 and Equation 13.

$$\|y - Rs\|^2 = A + B \quad \text{(Equation 14)}$$

(Equation 15)

$$\mathcal{A} = \sum_{k=5}^{8} (y_k - \alpha_2 s_k)^2 \quad \text{(Equation 16)}$$

$$\mathcal{B} = \sum_{k=1}^{4} \left( y_k - \alpha_1 s_k - \sum_{j=5}^{8} R_{k,j} s_j \right)^2.$$

Equation 15 being the first term of Equation 14 is minimized so as to obtain soft symbol estimates $\hat{s}_k$ where k is 5, 6, 7, and 8 as with Equation 17, at the step S220.

$$\hat{s}_k = \frac{y_k}{\alpha_2}, k = 5, 6, 7, 8. \quad \text{(Equation 17)}$$

Thereafter, the constellation point closest to such values and the surrounding constellation points therearound are found. That is, $M_A$ numbers of surrounding points with respect to the respective $\hat{s}_k$ and a set $S_A$ with total $(M_A)^4$ numbers of points are obtained. Furthermore, a set $\Phi_A$ of A values is calculated at step S230.

As Equation 15 is formed with a sum of four independent terms, the four terms can be each considered in a separate manner. That is, a rounding like method is used to find the closest point with respect to the respective $\hat{s}_k$ where k is 5, 6, 7, and 8, and the second closest point is obtained by adding or subtracting 2 to or from the closest point in case the constellation is given by Equation 7.

In this way, with the present invention, $M_A$ numbers of surrounding points are calculated with respect to the respective $\hat{s}_k$. The ik-th closest point to the point $\hat{s}_k$ is expressed by $\tilde{s}_k^{(i_k)}$ where k is 5, 6, 7, and 8. A set with the total $(M_A)^4$ numbers of points is represented by $S_A$ as with Equation 18.

$$S_A = \{(\tilde{s}_5^{(i_5)}, \tilde{s}_6^{(i_6)}, \tilde{s}_7^{(i_7)}, \tilde{s}_8^{(i_8)}) : i_5, i_6, i_7, i_8 = 1, \ldots, M_A\}.$$
(Equation 18)

A set of A values where the respective points of Equation 18 are computed by applying them to Equation 15 is represented by $\Phi_A$ as with Equation 19.

$$\Phi_A = \{A_{i_5,i_6,i_7,i_8} : i_5, i_6, i_7, i_8 = 1, \ldots, M_A\} \quad \text{(Equation 19)}$$

The complexity usually becomes $(M_A)^4$ in order to calculate $\Phi_A$ with $(M_A)^4$ numbers of elements. However, with the present invention, as A is a sum of four independent terms, the respective $(y_k - \alpha_2 s_k)^2$ are computed by $M_A$, and the computed values are combined with each other by $(M_A)^4$. Therefore, the complexity becomes $4M_A$.

Then, Equation 16 being the second term of Equation 14 is minimized so as to calculate soft symbol estimates $\hat{s}_k$ where k is 1, 2, 3, and 4 as with Equation 20, at the step S240.

$$\hat{s}_k(\tilde{s}_A) = \frac{y_k - R_{k,5}\tilde{s}_5^{(i_5)} - R_{k,6}\tilde{s}_6^{(i_6)} - R_{k,7}\tilde{s}_7^{(i_7)} - R_{k,8}\tilde{s}_8^{(i_8)}}{R_{k,k}}, \quad \text{(Equation 20)}$$

$$k = 1, 2, 3, 4.$$

In Equation 20, $\tilde{s}_A = (\tilde{s}_5^{(i_5)}, \tilde{s}_6^{(i_6)}, \tilde{s}_7^{(i_7)}, \tilde{s}_8^{(i_8)})$.

Now, $M_B$ numbers of surrounding points are calculated with respect to the respective $\hat{s}_k$, and a set $S_B$ with total $(M_B)^4$ numbers of points is obtained. Furthermore, the solution set $\Phi_B$ of B values is calculated at the step S250.

The values of $S_B$ and $\Phi_B$ can be calculated in the same way as with the calculation of the values $S_A$ and $\Phi_A$. First, assuming that $\tilde{s}_k^{(i_k)}(\tilde{s}_A)$ where k is 1, 2, 3, and 4 indicate the constellation points $i_k$-th closest to the points obtained by way of Equation 20 being the points $\hat{s}_k(\tilde{s}_A)$ where k is 1, 2, 3, and 4, $M_B$ numbers of close points are calculated with respect to the respective $\hat{s}_k(\tilde{s}_A)$ where k is 1, 2, 3, and 4. These points can be calculated in the same way as with the above-calculated $\tilde{s}_k^{(i_k)}$ where k is 5, 6, 7, and 8. A set with the calculated total $(M_B)^4$ numbers of points is indicated by $S_B(\tilde{s}_A)$, and expressed by Equation 21, while the solution set $\Phi_B(\tilde{s}_A)$ of the B values calculated by applying the respective points to Equation 16 is expressed by Equation 21 and Equation 22.

$$S_B(\tilde{s}_A) = \{(\tilde{s}_1^{(i_1)}(\tilde{s}_A), \tilde{s}_2^{(i_2)}(\tilde{s}_A), \tilde{s}_3^{(i_3)}(\tilde{s}_A), \tilde{s}_4^{(i_4)}(\tilde{s}_A)) : i_1, i_2, i_3, i_4 = 1, \ldots, M_B\}. \quad \text{(Equation 21)}$$

$$\Phi_B(\tilde{s}_A) = \{B_{i_1,i_2,i_3,i_4}(\tilde{s}_A) : i_1, i_2, i_3, i_4 = 1, \ldots, M_B\} \quad \text{(Equation 22)}$$

The final point set S of constellations is calculated by doing the sum of $S_A$ and the point set $S_B(\tilde{s}_A)$ as with Equation 23, and the solution set $\Phi_A$ and the solution set $\Phi_B(\tilde{s}_A)$ are put together so as to calculate the final solution set $\Phi$ of metric values as with Equation 24, at the step S260.

$$S = \{(\tilde{s}_1(\tilde{s}_A), \tilde{s}_2(\tilde{s}_A), \tilde{s}_3(\tilde{s}_A), \tilde{s}_4(\tilde{s}_A), \tilde{s}_5^{(i_5)}, \tilde{s}_6^{(i_6)}, \tilde{s}_7^{(i_7)}, \tilde{s}_8^{(i_8)}) : i_5, i_6, i_7, i_8 = 1, \ldots, M_A\} \quad \text{(Equation 23)}$$

$$\Phi = \{A_{i_6,i_7,i_8,i_9} + \tilde{B} : i_5, i_6, i_7, i_8 = 1, \ldots, M_A\} \quad \text{(Equation 24)}$$

Finally, the likelihood $L_E(x_k|y)$ with respect to the respective bits is calculated by using them at the step S270.

Previously, total $(M_A M_B)^4$ numbers of constellation points and metric values $\|y - Rs\|^2$ corresponding thereto were calculated. When an intersection of the point set S and $X_{k,+1}$, $X_{k,+1}$ of Equation 4 is calculated by using them, the likelihood $L_E(x_k|y)$ with respect to the respective bits can be calculated by using Equation 3.

Meanwhile, the minimum number of constellation points calculated in the above way is 256 ($M_A = M_B = 2$), and the likelihood $L_E(x_k|y)$ is calculated with respect to all those points. However, in many cases, for example, in case the signal-to-noise ratio (SNR) is high, or in case the channel status is good, or in case the size of constellation is small (the quadrature phase shift keying QPSK, 16-QAM), the calculating of $L_E(x_k|y)$ with respect to all the 256 numbers of points makes only the complexity be heightened without improving the performance characteristics. Accordingly, in case the complexity is lowered without deteriorating the performance characteristics with the usage of the constellation points with a size smaller than 256, another method is used, which will now be described with reference to FIG. 3.

FIG. 3 is a flowchart illustrating a signal detection method according to another exemplary embodiment of the present invention.

Referring to FIG. 3, as with the exemplary embodiment of FIG. 2, the maximum ML resolution or the augmented channel matrix $\hat{H}$ is QR-decomposed so as to express $\|y - Rs\|^2$ at the step S310. Thereafter, as in the exemplary embodiment of FIG. 2, the soft symbol estimates $\hat{s}_k$ where k is 5, 6, 7, and 8 are calculated as with Equation 17, at the step S320.

Thereafter, in case $M_A$ is 2, a set $S_A$ of $(M_A)^4$ numbers of points and a solution set $\Phi_A$ of A values are calculated at the step S330.

Thereafter, $\xi_A$ numbers of elements are selected from the set $S_A$ and the solution set $\Phi_A$ at the step S340. The value $\xi_A$ may range from 1 to 16. As the set of constellation points given thereby may have a dimensional value range from 1 to 256, such a value is controlled properly depending upon the size of constellation or the channel status so that only the minimum complexity can result without deteriorating the signal detection capacity. It is important here to list the elements of the solution set $\Phi_A$ in a sequence of from the smallest to the largest, and select relatively small values.

As the respective set has sixteen (16) elements, the number of possible listings is given by $1 \times 2 \times 3 \times \ldots \times 6 = 16!$.

It can be easily shown first of all that $A_{1,1,1,1}$ is an element with a smallest size among the elements of the solution set $\Phi_A$ of Equation 19. Then, four elements $\{A_{2,1,1,1}, A_{1,2,1,1}, A_{1,1,2,1}, A_{1,1,1,2}\}$ are listed in a dimensional sequence. In this step, it is required to make value size comparison maximally six times. Now, assume that $d_n$, n=1, 2, 3, 4 represents the position of 2 at the n-th smallest element script among the four elements. For example, in case the four elements are listed in a dimensional sequence to be $A_{1,2,1,1} < A_{1,1,1,2} < A_{2,1,1,1} < A_{1,1,2,1}$, it is given that $d_1 = 2$, $d_2 = 4$, $d_3 = 1$, $d_4 = 3$. Furthermore, $A[d_{n_1}, \ldots, d_{n_N}]$, $N \leq 4$ represents the value of the element where the script $i_j$ located at the position of $d_{n_1}, \ldots, d_{n_S}$ among the values of the elements $A_{i_5,i_6,i_7,i_8}$ of $\Phi_A$ has a value of 2. For example, in case it is given that $d_1 = 2$, $d_2 = 4$, $d_3 = 1$, $d_4 = 3$, $A[d_{n_1}, \ldots, d_{n_N}]$ have values of $A[d_2] = A_{1,1,1,2}$, $A[d_4] = A_{1,1,2,1}$, $A[d_1, d_3] = A_{2,2,1,1}$, $A[d_1, d_2, d_4] = A_{1,2,2,2}$, $A[d_1, d_2, d_3, d_4] = A_{2,2,2,2}$). In this case, $A[d_1$ is the second smallest element among the elements of the solution set $\Phi_A$, and $A[d_2]$ is the third smallest element among the elements of the solution set $\Phi_A$. Furthermore, $A[d_1, d_3, d_4]$ is the fourteenth smallest element among the elements of the solution set $\Phi_A$, while $A[d_2, d_3, d_4]$ is the fifteenth smallest element among the elements of the solution set $\Phi_A$, and $A[d_1, d_2, d_3, d_4]$ is the sixteenth smallest element among the elements of the solution set $\Phi_A$, (i.e., the largest element). Therefore, only the remaining ten elements among the sixteen (16) elements of the solution set $\Phi_A$ can be listed in a dimensional sequence. The listing can be achieved by making size comparison minimally three times or maximally six times. Such a listing is illustrated in FIG. 4, and the listed elements are given in FIG. 5. As the complexity thereof is minimally 9 or maximally 12, they have relatively low complexity.

Thereafter, $\hat{s}_k$, k=1, 2, 3, 4 is calculated by using the $\xi_A$ numbers of element values selected from $S_A$, at the step S350.

That is, the $\xi_A$ numbers of elements are substituted at Equation 16 so as to calculate such a value as with Equation 20.

Furthermore, in case $M_B$ is 2, a set $S_B$ of $(M_B)^4$ numbers of points and a solution set $\Phi_8$ of B values are calculated at the step S360. Thereafter, $\xi_B$ numbers of elements are selected from the set $S_B$ and the solution set $\Phi_{13}$ at the step S370. At this time, the way of selection is the same as that of selecting $\xi_A$ numbers of elements from the $S_A$ and the $\Phi_A$.

Then, $\xi_A$ numbers of elements and $\xi_B$ numbers of elements are put together so as to obtain S, and the solution set $\Phi_A$ and the solution set $\Phi_B$ corresponding thereto are put together so as to calculate the final solution set $\Phi$ at the step S380.

Finally, the likelihood $L_E(x_k|y)$ with respect to the respective bits is calculated at the step S390.

The above-described exemplary embodiments of the present invention may be realized not only by way of method and apparatus, but also by way of a program conducting the functions corresponding to the structural features according to the embodiments of the present invention or a program-recorded medium.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of detecting signals at a receiver of a communication system with multiple input multiple output antennas, the method comprising:
    calculating, by the receiver, a square of a distance between a received signal vector and a channel status-considered transmission symbol vector;
    classifying, by the receiver, the square of the distance into a first component and a second component;
    calculating, by the receiver, a plurality of first soft symbol estimates by minimizing the first component;
    calculating, by the receiver, a solution set of the first component on the basis of the plurality of first soft symbol estimates;
    calculating, by the receiver, a plurality of second soft symbol estimates by minimizing the second component;
    calculating, by the receiver, a solution set of the second component on the basis of the plurality of second soft symbol estimates; and
    calculating, by the receiver, a final solution set by doing a sum of the solution set of the first component and the solution set of the second component.

2. The method of claim 1, wherein the step of calculating the solution set of the first component comprises finding a plurality of first points around the plurality of first soft symbol estimates on a constellation, and calculating the solution set of the first component by using the plurality of first points.

3. The method of claim 2, wherein the step of finding the plurality of first points comprises finding a first closest point by rounding with respect to the plurality of first soft symbol estimates, respectively.

4. The method of claim 3, wherein the step of finding the plurality of first points comprises finding a second closest point by adding 2 to the first closest point or subtracting 2 therefrom.

5. The method of claim 2, wherein the step of calculating the solution set of the second component comprises finding a plurality of second points around the plurality of second soft symbol estimates on the constellation, and calculating the solution set of the second component by using the plurality of second points.

6. The method of claim 5, wherein the step of finding the plurality of second points comprises finding a first closest point by rounding with respect to the plurality of second soft symbol estimates, respectively.

7. The method of claim 6, wherein the step of finding the plurality of second points comprises finding a second closest point by adding 2 to the first closest point or subtracting 2 therefrom.

8. The method of claim 5, further comprising calculating a point set on the constellation by doing a sum of the plurality of first points and the plurality of second points, and calculating a likelihood of the respective bits of the signals by using the point set and the final solution set.

9. The method of claim 1, wherein the step of calculating the square of the distance comprises QR-decomposing a maximum likelihood resolution.

10. The method of claim 1, wherein the step of calculating the square of the distance comprises QR-decomposing an augmented channel matrix.

11. A method of detecting signals at a receiver of a communication system with multiple input multiple output antennas, the method comprising:
    calculating, by the receiver, a square of a distance between a received signal vector and a channel status-considered transmission symbol vector;
    classifying the square of the distance into a first component and a second component;
    calculating, by the receiver, a plurality of first soft symbol estimates by minimizing the first component;
    calculating, by the receiver, a solution set of the first component on a basis of the plurality of first soft symbol estimates;
    selecting, by the receiver, a part of the solution set of the first component;
    calculating, by the receiver, a plurality of second soft symbol estimates by using the selected part of the solution set of the first component;
    calculating, by the receiver, a solution set of the second component on a basis of the plurality of second soft symbol estimates;
    selecting, by the receiver, a part of the solution set of the second component; and
    calculating, by the receiver, a final solution set by doing a sum of the selected part of the first solution set of the first component and the selected part of the solution set of the second component.

12. The method of claim 11, wherein the step of calculating the solution set of the first component comprises finding a plurality of first points around the plurality of first soft symbol estimates on a constellation, and calculating the solution set of the first component by using the plurality of first points, and the step of calculating the solution set of the second component comprises finding a plurality of second points around the plurality of second soft symbol estimates on the constellation, and calculating the solution set of the second component by using the plurality of second points.

13. The method of claim 12 further comprising:
    selecting a first point corresponding to the selected part of the solution set of the first component;
    selecting a second point corresponding to the selected part of the solution set of the second component;
    calculating a point set on the constellation by doing the sum of the selected first point and the selected second point; and calculating a likelihood of the respective bits of the signals by using the point set and the final solution set.

14. The method of claim 12, wherein the step of selecting the part of the solution set of the first component comprises:
listing elements of the first component solution set in a sequence of from a smallest to a largest; and
selecting the listed elements of the first component solution set sequentially from the smallest, and
wherein the step of selecting the part of the solution set of the second component comprises:
listing elements of the second component solution set in a sequence of from the smallest to the largest; and
selecting the listed elements of the second component solution set sequentially from the smallest.

15. The method of claim 12, wherein the number of the first points and the number of the second points are 2 or less, respectively.

16. The method of claim 12, wherein the step of finding the plurality of first points comprises finding a first closest point by rounding with respect to the plurality of first soft symbol estimates, and finding a second closest point by adding 2 to the first closest point or subtracting 2 therefrom.

17. The method of claim 12, wherein the step of finding the plurality of second points comprises finding a first closest point by rounding with respect to the plurality of second soft symbol estimates, respectively, and finding a second closest point by adding 2 to the first closest point or subtracting 2 therefrom.

18. A receiver for a communication system with a multiple input multiple output antenna, the receiver comprising:
a plurality of receiver antennas for receiving signals;
a detector for producing a likelihood of respective bits of the received signals from the plurality of the receiver antennas and for detecting the received signals; and
a decoder for decoding the detected signals from the detector,
wherein a likelihood is produced by classifying a square of a distance between a received signal vector and a channel status-considered transmission symbol vector into a first component and a second component, and using a plurality of first soft symbol estimates obtained through minimizing the first component, a plurality of second soft symbol estimates obtained through minimizing the second component, first points around the plurality of first soft symbol estimates on a constellation, and second points around the plurality of second soft symbol estimates on the constellation.

19. The receiver of claim 18, wherein the first points comprise a first closest point calculated by rounding with respect to the plurality of first soft symbol estimates, respectively.

20. The receiver of claim 18, wherein the first points comprise a second closest point found by adding 2 to a first closest point or subtracting 2 therefrom.

* * * * *